United States Patent [19]
van Capelleveen

[11] Patent Number: 4,993,540
[45] Date of Patent: Feb. 19, 1991

[54] LOW BACK PRESSURE CONVEYOR

[75] Inventor: Pieter van Capelleveen, Driebergen-Rijsenburg, Netherlands

[73] Assignee: Gebr. Van Capelleveen B.V., Utrecht, Netherlands

[21] Appl. No.: 455,905

[22] Filed: Dec. 21, 1989

Related U.S. Application Data

[63] Continuation of Ser. No. 263,986, Oct. 27, 1988, abandoned, which is a continuation of Ser. No. 28,860, Mar. 23, 1987, abandoned.

[30] Foreign Application Priority Data

Mar. 21, 1986 [NL] Netherlands .......................... 8600734

[51] Int. Cl.$^5$ ............................................. B65G 17/00
[52] U.S. Cl. .................... 198/779; 198/831; 198/852
[58] Field of Search ........... 198/779, 852, 831, 803.01, 198/842, 843; 403/344

[56] References Cited

U.S. PATENT DOCUMENTS

| | | | |
|---|---|---|---|
| 1,743,728 | 1/1930 | Pangborn | 198/779 |
| 4,244,464 | 1/1981 | van Capelleveen | 198/831 X |
| 4,402,390 | 9/1983 | Feeney | 193/37 |

FOREIGN PATENT DOCUMENTS

| | | | |
|---|---|---|---|
| B474552 | 7/1976 | Australia . | |
| 1004167 | 1/1977 | Canada | 198/790 |
| 1199301 | 1/1986 | Canada | 198/779 |
| 0152639 | 8/1985 | European Pat. Off. | 198/779 |
| 2516085 | 10/1976 | Fed. Rep. of Germany | 198/779 |
| 7803844 | 10/1979 | Netherlands . | |
| 1297173 | 11/1972 | United Kingdom . | |
| 2063201 | 6/1981 | United Kingdom | 198/831 |
| 1604039 | 12/1981 | United Kingdom | 198/779 |
| 2084103 | 4/1982 | United Kingdom | 198/779 |
| 2175560 | 12/1986 | United Kingdom | 198/803.01 |
| 2177777 | 1/1987 | United Kingdom | 198/790 |

Primary Examiner—Joseph E. Valenza
Assistant Examiner—Cheryl L. Gastineau
Attorney, Agent, or Firm—Cushman, Darby & Cushman

[57] ABSTRACT

A conveyor having a carrying surface formed by rollers (12, 13) which are freely rotatably mounted on bars (5) extending transversely between the links (3, 4) of side chains (1, 2). The chain links (3, 4) are slidable one into another to enable the inside-bend chain (2) to temporarily contract when moving through a bend. The rollers (12) of a plurality thereof are mounted next to each other on each roller-carrying bar (5).

5 Claims, 3 Drawing Sheets

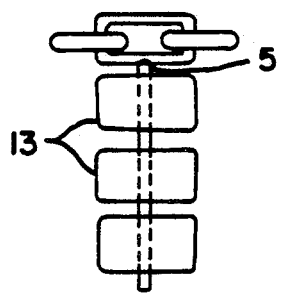
FIG. IA
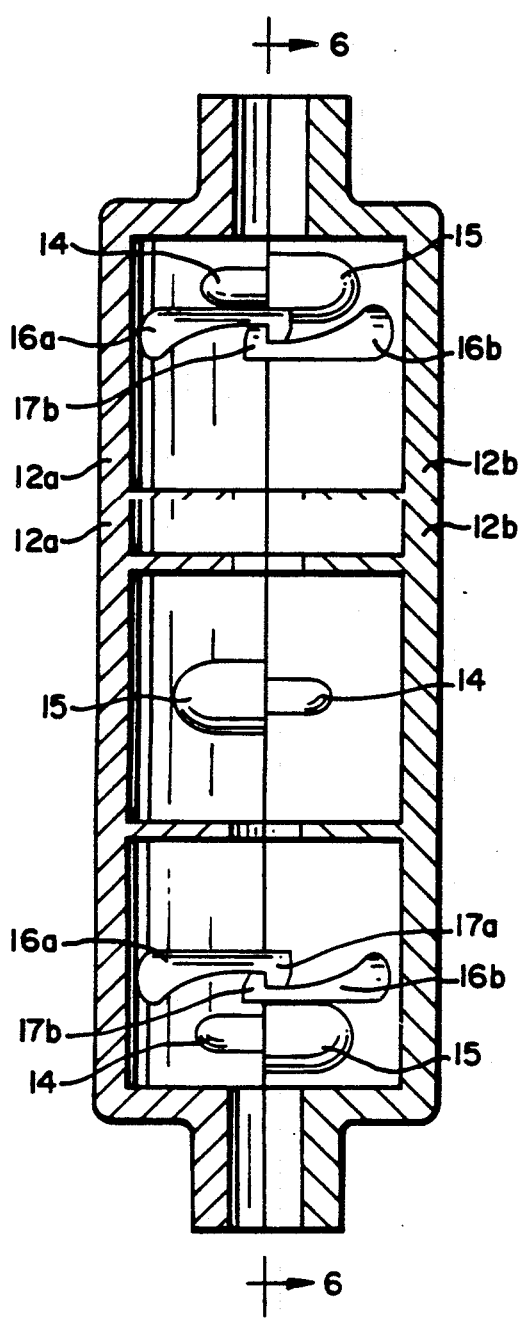
FIG. 5
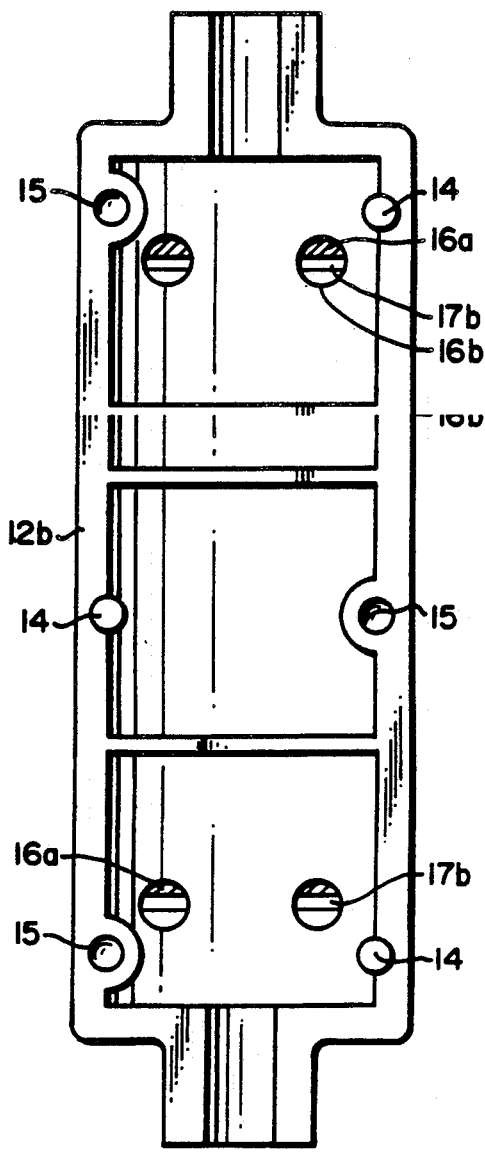
FIG. 6

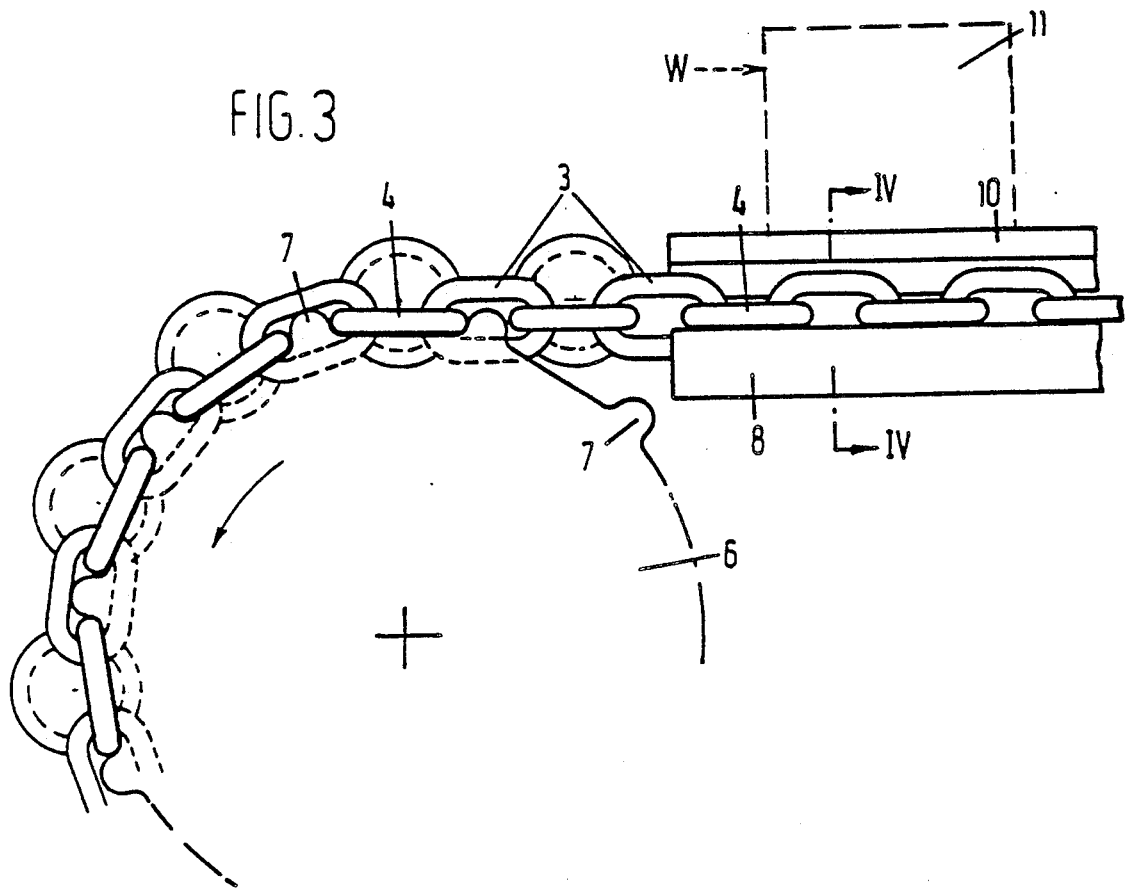
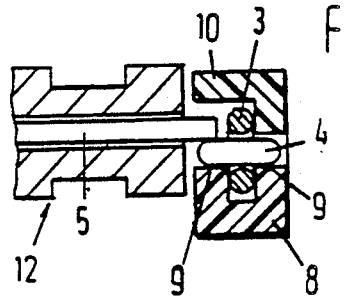

LOW BACK PRESSURE CONVEYOR

This is a continuation of application Ser. No. 07/263,986, filed Oct. 27, 1988, which was abandoned upon the filing hereof, which was a continuation of application Ser. No. 07/028,860, filed Mar. 23, 1987, now abandoned.

BACKGROUND OF THE INVENTION

This invention relates to a conveyor, in particular one whose carrying surface is formed by rollers mounted for free rotation and extending transversely to a direction of transport between two endless side chains adapted to be passed over return and drive wheels, the side chains pulling the rollers through the transport track and being of the type with interengaging parts lying in planes substantially perpendicular to each other, said parts allowing a temporary shortening of a chain by temporarily sliding one into another for traversing bends.

In a similar conveyor disclosed is British patent application No. 2,084,103, articles resting on the bearing rollers are carried along by the travelling conveyor or as long as the articles do not meet an obstacle, at least a resistance of any significance. As soon as this is the case, e.g. when the articles are not discharged from the conveyor or are discharged at a lower speed than that at which they are placed on the conveyor, jamming occurs at the discharge end, whereby the rollers start rotating, with the conveyor rolling underneath the articles. This arrangement prevents wear to the underside of the articles or to the conveyor.

As the rollers in the prior conveyor are constructed as tubes extending the full width of the transporting surface and being supported exclusively at their end portions on stubs projecting from the respective side chains, wear on the bottom of a relatively large article, such as a box, which is at a standstill in a corner zone, cannot be avoided. For the speed at which the outside bend end of each roller is displaced underneath the bottom of the article is higher than the speed of the inside bend end. At best, the rotation speed of the rollers will be determined by the speed of one end of the rollers rolling over the bottom of the article and the other roller end will slip over said bottom, thereby causing wear at that location. The friction occurring thereby, however, will retain said roller end relative to the other rolling end, so that the rollers will be thrown out of alignment with the bearing stubs of the side chains and can no longer rotate. The object contemplated with the prior conveyor, i.e. to enable the carrying surface to move underneath stationary articles without friction, is therefore not achieved with articles having a large bottom surface.

SUMMARY OF THE INVENTION

It is an object of the present invention to provide a similar conveyor which avoids this drawback and by means of which also large, heavy articles can be displaced along any desired track and without causing wear to the conveyor or to articles carried by it, which stand still or move relatively slowly in corners.

To this end, according to the present invention, the rollers are mounted on through bars connected on either side to chains which can be passed through curved tracks in fitting moulded sections, with a plurality of roller subassemblies or loose wheels being mounted on each bar.

Thus differences in peripheral speed at the inside bend side and at the outside bend side of bearing rollers rolling underneath a stationary article are taken up in a simple manner.

In a further embodiment of the present invention, the roller subassemblies or wheels may be radially split so that they can be mounted on an already-barred conveyor frame, e.g. by means of a snap-on or click-fit connection. The barred conveyor frame can thus be manufactured and finished (by zinc-plating, coating, etc.) continuously before the rollers are mounted.

It is observed that a conveyor having side chains of a type allowing a temporary shortening for traversing corners, with the side chains being interconnected by through bars forming the carrying surface of the conveyor, is known per se from NL-A-7803844.

EP-A-0152639 discloses per se a conveyor having side chains connected by bars or shafts with a plurality of rollers being loosely mounted for rotation on each shaft. However, the chains are composed of pairs of parallel plates interconnected by hollow bushings. Shafts connecting the side chains are inserted through said bushings. Such chains cannot be shortened temporarily for traversing a corner. Consequently, the conveyor is designed exclusively for transport along a straight track. Use is made of a plurality of loose rollers for each bar in order to simplify a change in width of the conveyor, i.e. by pulling the shafts out of the bushings, replacing the same and adjusting the number of rollers.

AU-B-474,552 discloses per se mounting elements forming a carrying surface of a conveyor on cross bars, however, in a totally different type of conveyor, i.e. one in which the elements forming the carrying surface fill up the space between successive cross bars and are connected to two of such successive bars. It is clear that this makes it impossible to traverse a bend with such a conveyor, since the load-bearing surface elements always keep the cross bars in a mutually parallel position.

BRIEF DESCRIPTION OF THE DRAWINGS

One embodiment of the conveyor according to the present invention will now be described, by way of example, with reference to the accompanying drawings, in which:

FIG. 1a is a partial top plan view of the conveyor when provided with a modified roller;

FIG. 3 is a diagrammatic side view of the driving mechanism of the side chains;

FIG. 4 is a cross section of a chain guide section according to arrows IV—IV of FIG. 3;

FIG. 5 is a longitudinal section of a divided roller having an external shape which is modified from that shown in FIGS. 1-4; and FIG. 6 is a view of a roller half according arrows VI—VI of FIG. 5.

DETAILED DESCRIPTION

Figure 1:
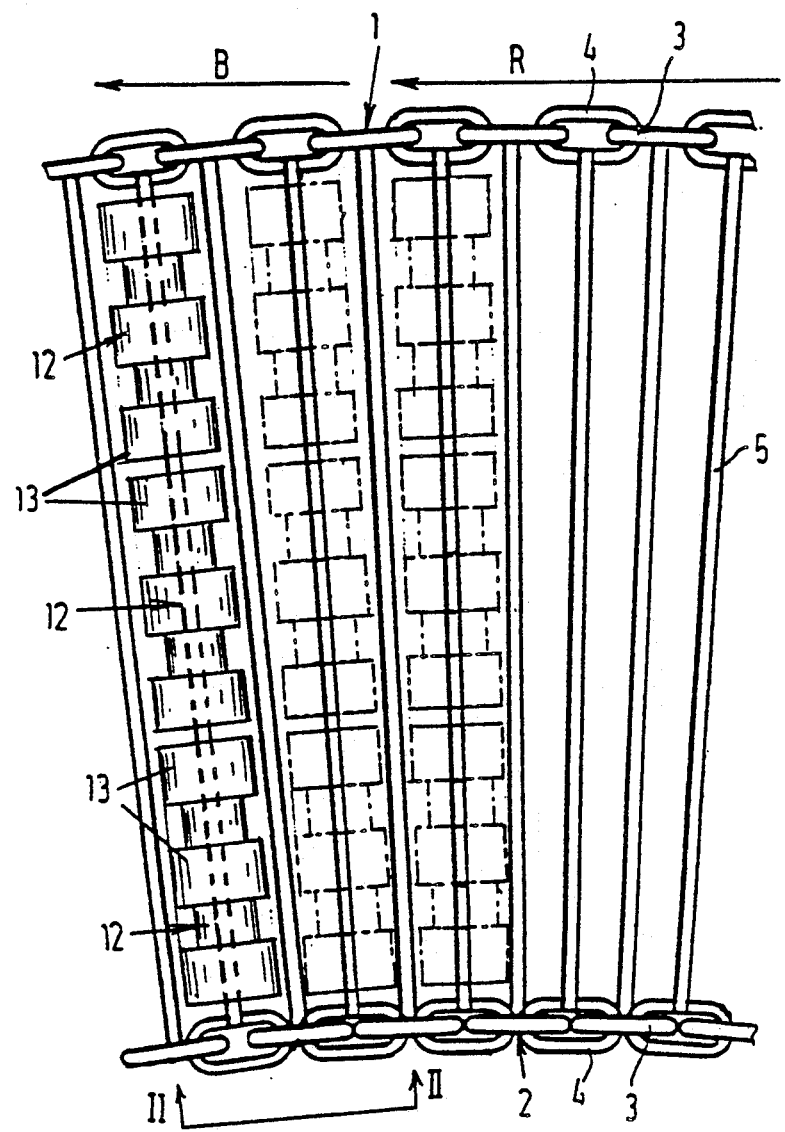
FIG. 1 is a top view of the moving part of a conveyor at the entry of a bend.
Figure 2:
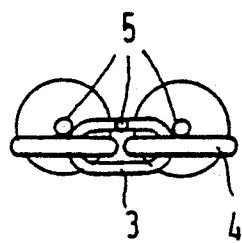
FIG. 2 is an end view according to arrows II—II of FIG. 1.

As shown in the drawings, the conveyor is provided with two endless side chains 1, 2, each composed of vertical links 3 and horizontal links 4. Respective links 3 and respective links 4 of the side chains 1 and 2 are connected pairwise by bars 5. The conveyor can be driven by sprockets 6 (see FIG. 3) having teeth 7 engaging with the horizontal links 4. The conveyor is guided by fitting moulded sections, such as (see FIG. 4) a guide channel 8 accommodating the lower portion of the vertical links 3, while the horizontal links 4 slide over the upper edges 9 of channel 8. A retaining section 10 prevents the chain from being lifted out of channel 8.

In order that the barred conveyor 1-5 may function as a so-called low back pressure conveyor, i.e. as soon as an article 11 lying on the conveyor encounters a resistance W (see FIG. 3), the conveyor will move underneath the article 11 without causing wear, according to the present invention, a plurality of rollers are mounted for free rotation on alternate ones of the bars 5. In FIG. 1 the rollers are in the form of three subassemblies 12 of three interconnected wheels 13 each. The rollers may also be in the form of distinct loose wheels 13 which are not interconnected to other wheels, as shown in FIG. 1a. Depending on the diameter and/or design of the rollers, every second bar 5 may be fitted with rollers, or each bar, or alternately, differently constructed rollers may be used. It is also possible to mount the bars 5 alternately at different heights.

The side chains are of the type allowing a temporary shortening for traversing a bend, e.g. as shown in FIG. 1. Upon entering the bend B from the straight track R, the links 3, 4 of side chain 2 slide one into another. When the conveyor moves underneath a box 11 which is stationary in the bend, the subassemblies 12 traversing the outside bend will rotate faster than subassemblies 12 traversing the inside bend. The maximum diameter of the wheel 13 of each subassembly 12 is determined by the mutual slidability of the chain.

It is clear that the links of chains 1, 2 need not necessarily be constructed as the depicted closed, elongate rings 3, 4 in order to be temporarily shortened in the inside bend zones. What is essential is that the successive chain portions engage each other substantially at right angles, allowing them to slide one into another over a given distance.

In FIGS. 5 and 6 there is shown an elongated, divided roller in the form of roller halves 12a and 12b, which centered by pins 14 and holes 15, can be placed about a bar 5 and be fixed relatively to each other by a snap closure. In the embodiment shown, each roller half 12a, 12b is provided for the purpose of said snap closure with resilient arms 16a, 16b, having at the ends hooks 17a, 17b, which during the approaching movement of the roller halves 12a, 12b, can temporarily bend laterally so as to subsequently engage with the end hooks behind each other. It is clear that other snap closures can be employed instead.

The essential feature is that a plurality of rollers are mounted on a bar 5 in longitudinal direction of bar 5 in juxtaposed relationship.

I claim:

1. A low back pressure chain conveyor comprising: two endless side chains each constructed of a series of interengaging links, longitudinally adjacent links in each side chain lying in planes which are substantially perpendicular to each other, said links allowing a temporary shortening of one side chain relative to the other side chain by temporarily sliding one into another in series along the respective side chain for traversing lateral bends;
   through bars extending transversely between the chains, each said through bar having opposite ends connected to corresponding links of respective ones of said side chains; and
   a plurality of rollers mounted on each of alternate ones of said through bars for free rotation relative to the respective bar and, on each bar, relative to one another, so that as the conveyor executes a lateral bend having an inside and an outside, at least one said roller on each bar and located nearer said outside of said lateral bend can rotate faster than at least one other said roller on each bar and located nearer said inside of said lateral bend.

2. A chain conveyor as in claim 1, wherein:
at least some of the rollers are constituted by roller subassemblies each formed of a plurality of wheel portions interconnected by portions of lesser diameter than the wheel portions thereof.

3. A chain conveyor as in claim 1, wherein:
at least some of the rollers are discrete wheels which are separate members from adjacent rollers on the same bar.

4. A chain conveyor as in claim 1, wherein:
at least some of the rollers are each radially split into two connectable portions so that they can be mounted on a previously constructed chain and bar assembly.

5. A chain conveyor as in claim 4, wherein:
the two connectable portions of each radially split roller are provided with complementary snap-together fastener means for assembling and mounting the radially split rollers on the respective bars.

* * * * *